United States Patent [19]

Scheps

[11] Patent Number: 5,528,611
[45] Date of Patent: Jun. 18, 1996

[54] REPETITIVELY Q-SWITCHED LASER PUMPED BY LAER DIODES AND Q-SWITCHED WITH AN INTRACAVITY VARIABLE SPEED MOVING APERTURE

[76] Inventor: Richard Scheps, 2645 Shalimar Cove, Del Mar, Calif. 92014

[21] Appl. No.: 389,463

[22] Filed: Feb. 16, 1995

[51] Int. Cl.[6] .................................................. H01S 3/11
[52] U.S. Cl. .................... 372/14; 372/9; 372/103
[58] Field of Search ........................ 372/92, 98, 99, 372/103, 9, 14, 15, 66

[56] References Cited

U.S. PATENT DOCUMENTS

| | | | |
|---|---|---|---|
| 3,281,712 | 10/1966 | Koester | 372/14 |
| 4,783,787 | 11/1988 | Doi et al. | 372/19 |
| 4,862,468 | 8/1989 | Fink et al. | 372/15 |
| 5,097,477 | 3/1992 | Scheps | 372/75 |
| 5,249,192 | 9/1993 | Kuizenga et al. | 372/99 |
| 5,249,196 | 9/1993 | Scheps | 372/66 |
| 5,329,544 | 7/1994 | Shachrai et al. | 372/99 |
| 5,331,651 | 7/1994 | Becker et al. | 372/15 |

*Primary Examiner*—Léon Scott, Jr.
*Attorney, Agent, or Firm*—Harvey Fendelman; Thomas Glenn Keough

[57] ABSTRACT

A laser is end pumped by laser diodes and is repetitively Q-switched using an intracavity variable speed moving aperture. The aperture apparatus includes a precision motor which drives a pair of matched aperture blades and produces efficient Q-switched operation over a wide range of output powers and repetition rates. Each aperture blade may contain an identical number of transmissive and opaque regions, and two aperture blades may be mounted onto the motor in a manner that allows continuous adjustment of the aperture width. In a preferred embodiment the aperture blades are shaped as circular discs. The laser resonator mode is nearly hemispherical, and the aperture blade is located at or near the laser resonator mode waist. When pumped with the optimum pump flux, efficient repetitively Q-switched operation is obtained as long as the Q-switch opening time is shorter than the pulse build-up time. The pulse build-up time can be calculated, and the Q-switch opening time is defined in accordance with this inventive concept. The Q-switch opening time is a function of the laser resonator mode diameter at the location of the aperture blade and the velocity of the aperture blade as it moves through the resonator mode. The Q-switch opening time is a fraction of the time required for the edge of the aperture blade to traverse the entire resonator mode diameter.

32 Claims, 12 Drawing Sheets

REPETITIVELY Q-SWITCHED LASER PUMPED BY LAER DIODES AND Q-SWITCHED WITH AN INTRACAVITY VARIABLE SPEED MOVING APERTURE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to lasers and Q-switched techniques, and particularly to a technique for repetitively Q-switching a laser diode-pumped laser using a variable speed moving aperture.

Lasers are devices that generate or amplify light. The beams of radiation that lasers emit or amplify have remarkable properties of directionality, spectral purity, and intensity. These properties have already to led to an enormous variety of applications. The essential elements of the laser device are: 1) a laser medium or gain element consisting of an appropriate collection of atoms, molecules, ions, or in some instances, a semi-conducting crystal; 2) a pumping process to excite these atoms, molecules, etc. into higher quantum mechanical energy levels; and, 3) suitable optical feedback elements that allow a beam of radiation to bounce back and forth repeatedly through the laser medium. The laser resonator contains an optical cavity which is defined by reflecting surfaces that are aligned to resonate the laser radiation within the optical cavity. The laser medium is contained within the optical cavity.

The elements of a laser come in a great variety of forms and fashions. One type of laser gain element that has numerous advantages compared to others is the solid-state laser medium consisting of a laser crystal with one or more types of dopant ions in a predetermined concentration. The solid sate laser gain element is generally optically pumped. The optical pump may be an incoherent source, such as a CW lamp including tungsten filament lamps or arc lamps or pulsed lamps such as flash lamps, or may be a monochromatic source. Monochromatic laser pump sources include ion lasers or dye lasers, or semiconductor laser diodes such as an aluminum gallium arsenide (AlGaAs) laser diode operating at approximately 808.5 nm, which can be used to pump a Nd:YAG (neodymium-doped yttrium aluminum garnet) solid state laser material. As an example of this type of laser see the article, "Efficient Laser Diode Pumped Nd Lasers," by Richard Scheps in *Applied Optics*, vol. 28 pp.89–91 (January, 1989).

In order for the optical pumping process to be effective, the photons incident on the laser medium must have certain properties. In particular, the pump radiation must be of a wavelength which is absorbed by the laser medium to generate either directly or indirectly the required population inversion for the desired laser transition.

Laser diode pumping of Nd:YAG lasers is well recognized. The laser diode output radiation must substantially match the desired absorption wavelength of the Nd:YAG laser medium which, in general, corresponds to a wavelength of 808.5 nm. This matching of the laser diode emission wavelength with the absorption wavelength and bandwidth of the Nd:YAG laser medium at 808.5 nm is required for efficient operation. Efficient operation in this context considers the pumping efficiency, which is the fraction of absorbed pump photons that populate the upper laser level. Efficient operation also considers the overall electrical power consumption by the pump diodes required to produce a given optical laser power from the Nd:YAG laser. The absorption bandwidth of Nd:YAG is approximately 1 nm.

Two types of diode pumping are generally practiced. The first is called transverse pumping. Transverse pumping describes a technique where the pump flux is incident upon the gain element at an angle, usually 90°, with respect to the optical propagation axis of the laser radiation within the optical resonator cavity. The second pumping technique is called longitudinal or end-pumping, and occurs when the pump flux is deposited in the laser gain element parallel to and coincident with the propagation axis for laser radiation contained within the optical resonator cavity. In general, longitudinal pumping of Nd:YAG lasers by laser diodes is preferred over transverse pumping for efficient $TEM_{00}$ operation owing to the overlap of the resonator mode with the inversion profile produced by the pump beam. The laser resonator mode describes the spatial distribution of optical energy in the laser resonator. $TEM_{00}$ operation describes the lowest order transverse electrical laser resonator mode. This mode of operation is desirable over other transverse modes as it generally requires the lowest threshold power and produces the lowest output beam divergence.

Longitudinal pumping has the potential to provide the lowest threshold power and highest slope efficiency operation of an optically pumped laser. This is because the energy deposition of the pump photons can be located directly within the active volume of the laser gain element. The active volume is determined by the geometry of the optical resonator.

Optical resonators generally consist of two or more flat or curved mirrors set up and aligned to produce optical feedback. The gain medium, which gives each type of laser its name, determines the output power or energy and ultimate tuning range of the emitted radiation. But it is the optical resonator that determines the spatial dimensions of the laser.

A wide range of laser resonator types have been developed and used for laser systems. Some types of optical resonators include plane parallel, confocal, concentric, or hemispherical type resonators. The resonator type is determined by the radius of curvature of the reflective mirrors defining the optical resonator cavity, and the location of each of these mirrors. For the simplest laser resonator cavity containing two reflective elements aligned to form a feedback path between them, the radius of curvature of each of these two mirrors and the spacing between the two mirrors determines the type of resonator. For example, if both mirrors are plane flat mirrors, the resonator type is called plane parallel. A hemispherical resonator consists of a flat mirror and a concave curved mirror separated by the radius of curvature of the curved mirror. In practical lasers, the hemispherical configuration is difficult to achieve because of alignment problems. Generally speaking, a nearly hemispherical resonator, which consists of a flat and curved mirror separated by slightly less than the radius of curvature of the curved mirror, is preferred.

The nearly hemispherical laser resonator mode has a focus or mode waist at the flat mirror, and the mode diameter expands from this waist as the radiation propagates towards the curved mirror. Typically the output coupler, which is the laser mirror though which the radiation is emitted by the laser, is the curved mirror, and the flat mirror is highly reflective (HR). Because the laser resonator mode waist occurs at the HR flat, the power density for the circulating optical radiation is highest at the mode waist. Typically, it is advantageous to place the laser gain element at or near this mode waist, as the extraction efficiency is greatest at this location.

In longitudinal pumping, the pump flux is focused onto the laser gain element and a resonator mode waist is typically located within the laser gain element. The pump efficiency increases as the pump power density increases. For these reasons, the most advantageous orientation for longitudinal pumping is to locate the pump beam waist or focus at or near the laser resonator mode waist within the laser gain element. The diameter of the pump waist should be no greater than the laser resonator mode waist. When the two waist dimensions are approximately equal they are said to be "mode-matched".

Q-switching is a technique which allows extremely high peak power operation of a laser. The Q-switch operates as an intracavity shutter, and remains closed during the time which the gain element is optically pumped. By remaining closed, optical feedback is prevented and radiative losses occur only through spontaneous emission. Typically, the laser gain element is pumped for a time comparable to the spontaneous emission lifetime for fluorescence from the upper laser level. Therefore, losses due to spontaneous emission are minimal and the laser gain element acts as a capacitor, storing the pump energy. Once the gain element is fully "charged", the Q-switch is opened. The intracavity flux builds up to a high peak intensity, and a high energy pulse is emitted by the Q-switched laser. Pulse widths on the order of 5 ns to approximately 40 ns are typically achieved with energies exceeding 1 J. Thus, peak powers of approximately 1 GW can readily be achieved with a Q-switched laser.

There are numerous types of Q-switches including electro-optical, acousto-optical, and mechanical Q-switches. In addition, there are two types of Q-switching. Single-shot Q-switching refers to a technique where the pump excitation is pulsed and the Q-switch opens one time for each pump pulse; therefore, the repetition rate for the Q-switch is determined by the maximum opening rate of the Q-switch or the maximum pulse rate of the pump source, whichever is lower. A second type of Q-switching is called repetitive Q-switching. In this case, the laser gain element is pumped continuously and the Q-switch is opened at a high repetition rate. The Q-switch opening rate is typically 10 kHz or higher, and the maximum Q-switch rate is determined by the desired operating parameters. That is, once the Q-switch opening rate is faster than the inverse of the spontaneous emission lifetime of the laser gain element, then the average Q-switched power is approximately equal to the CW power that would be achieved in the absence of Q-switching. For example, for Nd:YAG with an upper-state lifetime of approximately 200 µs, Q-switch opening rates exceeding 5 kHz produce average Q-switch powers comparable to the CW power that would be achieved under identical pump conditions. Therefore, increasing the Q-switched rate beyond 5 kHz would decrease the energy per pulse from the Q-switched laser. If the Q-switch rate is increased too high then the Q-switched pulse width also begins increase, further reducing the peak power available from the repetitively Q-switched laser.

Electro-optic Q-switches are typically used for single shot Q-switching and operate at rates generally below 100 Hz. Acousto-optic Q-switches are typically used for repetitive q-switching at rates of several kilohertz and higher. Laser diode-pumped Q-switched lasers provide a compact, efficient, high-peak power generating source. However, acousto-optic (AO) Q-switches are not the most effective device for diode-pumped repetitively Q-switched lasers for several reasons. The insertion loss of a Q-switch inside a laser cavity is problematic for diode pumping. Since CW pump fluxes are typically lower than those of other laser pumped sources, the insertion loss for an AO Q-switch arises from two sources. These are bulk scattering problems within the acousto-optic crystal itself and reflections of the laser resonator cavity mode by each surface of the AO Q-switched crystal. In addition, the insertion of an AO Q-switch inside a laser cavity requires expansion of the longitudinal cavity dimensions. For some resonator designs, the insertion of the AO Q-switch introduces astigmatism which lowers the overall optical conversion efficiency. From a pragmatic point of view, AO Q-switches and their associated electronics are expensive. This problem is compounded if different Q-switches with different optical coatings are required for different laser emission wavelength ranges of a given laser gain element.

One of the earliest Q-switched lasers used a mechanical rotating aperture. See R. J. Collins and P. Kisliuk, "Control of Population Inversion in Pulsed Optical Masers by Feedback Modulation," *Journal of Applied Physics*, vol 33, pp 2009–2011, 1962. However, the laser operated multi-mode, and no detailed consideration was given to the adjustment of the laser operating parameters in order to optimize the performance of the rotating aperture Q-switch. In addition, optical pumping in the Collins and Kisliuk work was transverse pumping using a flashlamp.

A patent by Kafka et al., U.S. Pat. No. 4,847,850 describes the use of a miniaturized Q-switched laser which is diode-pumped. This patent describes the advantages of Q-switching a diode-pumped laser in that the relatively short cavities characteristic of diode-pumped laser resonators provide short round-trip times and consequently short Q-switched pulses as long as the gain is high and the losses are low. The patent describes the use of several AO Q-switch materials including $TeO_2$ and $LiNbO_3$. However, these crystals introduce loss in the cavity, reducing the net gain. The net gain is the gain minus the loss.

SUMMARY OF THE INVENTION

A laser diode-pumped laser is configured to provide a small laser resonator mode waist. The laser gain element is longitudinally pumped, and a pump mode waist is located near the laser resonator mode waist. An intracavity mechanical moving aperture operating as a Q-switch is located near the laser resonator mode waist. Shuttering is provided by numerous apertures on a rotating disc, which is driven by a variable speed, precision motor to provide Q-switch rates up to approximately 3,000 Hz. The motion of the aperture through the resonator mode creates the same effect as a shutter. The conditions required for effective Q-switched laser operation using an intracavity variable speed moving shutter as a Q-switch are established. This inventive concept incorporates a diode-pumped laser resonator design that is most appropriate for the use of an intracavity, variable speed moving shutter as a Q-switch for a laser diode-pumped laser.

DETAILED DESCRIPTION OF THE PREFERRED EMBODIMENT

Figure 1B:
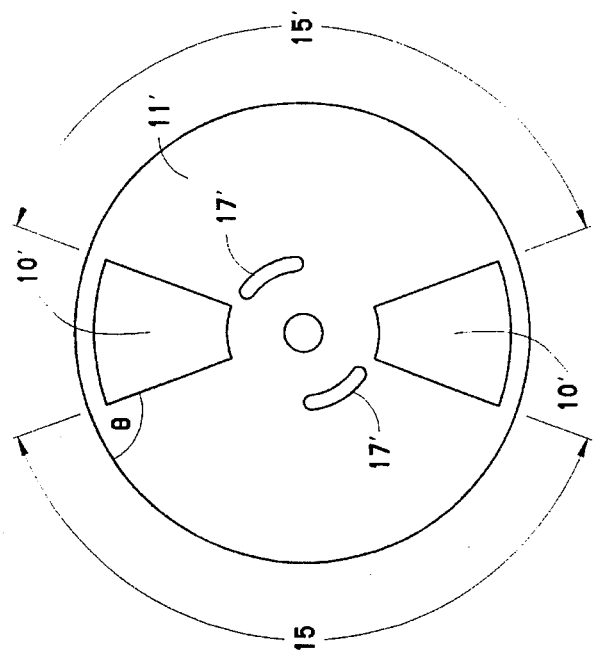
FIG. 1B illustrates an aperture wheel for a variable speed moving aperture apparatus.

This inventive concept involves the implementation of a laser diode-pumped optical resonator cavity with an intracavity Q-switch in the form of a variable speed moving aperture. Optically exciting the laser gain element in an end-pumping mode creates a "gain aperture" in the laser gain element which allows the laser to operate in the lowest order spatial transverse mode at the desired wavelength. The design of the laser resonator cavity provides a small diameter laser resonator mode at the location where the intracavity variable speed moving aperture is inserted. Q-switched performance is enhanced because of the combination of factors basic to the laser resonator design, including low insertion loss by the variable speed moving aperture, small resonator mode diameter at the location where the intracavity variable speed moving aperture is inserted, and the ability of the variable speed moving aperture to provide effective Q-switching independent of the polarization of the laser resonator cavity mode.

An advantage of locating the Q-switch near the laser resonator mode waist is that the Q-switch opening time, and hence the output pulse width, is inversely related to the laser resonator mode beam diameter. It is therefore important to have as small a resonator mode diameter as possible at the intracavity Q-switch location in order to minimize the laser Q-switch pulse width.

The design of the optical resonator cavity disclosed herein is generic and could be used in laser systems having a gain element with emissions at several fixed wavelength transitions such as Nd:YAG, where the 1.06 µm transition operates simultaneously with the laser lines at 1.32 µm, 1.34 µm, 1.36 µm, 1.42 µm, 1.44 µm, and 0.942 µm, or in other continuously tunable laser systems such as alexandrite, which tunes between approximately 720 nm and 840 nm. Other exemplary laser systems are:

Cr:LiCAF which can be tuned for emissions between approximately 720 nm and 850 nm;

Cr:LiSAF which can be tuned for emissions between approximately 760 nm and 1 µm;

Cr:LiSGAF which can be tuned for emissions between approximately 800 nm and 900 nm;

Tm:YAG which can be tuned for emissions between about 1.87 µm and 2.16 µm; Ho:YAG which can be tuned for emissions between approximately 2.05 µm and 2.15 µm, and between approximately 2.84 µm and 2.92 µm; and Er:YAG which can be tuned for emissions between approximately 2.7 µm and 2.96 µm.

A high-quality mechanical moving aperture offers several important advantages as an intracavity Q-switch in a diode-pumped laser. For example, the moving aperture introduces no loss in the cavity when the shutter is open and does not require different coatings for different wavelength ranges. In addition, the hold-off, by which is meant the ability of the Q-switch to prevent feedback when the switch is closed, is essentially infinite. In addition, the cost of the mechanical device is moderate, the drive electronics are straight-forward, there are no laser resonator mode polarization requirements, and the insertion of the intracavity moving aperture requires no adjustment of the longitudinal dimensions of the laser resonator cavity.

There are two difficulties in utilizing the intracavity moving aperture as a Q-switch. One is that current technology limits the maximum Q-switch pulse repetition rate to approximately 20 kHz. However, this limitation can be overcome with improvements in the drive motor and aperture wheel. These improvements can be readily introduced when the moving aperture is used in a diode-pumped laser, since where the laser resonator mode waist is small and the mode is $TEM_{00}$. The second difficulty in using the mechanical shutter as a Q-switch is that the shutter on/off time and Q-switch repetition rate are changed simultaneously when the motor speed is adjusted. Therefore, changing the repetition rate by adjusting only the motor speed can have undesired consequences.

In spite of these limitations, however, the moving aperture can be a useful device for Q-switching diode-pumped lasers. For longitudinally or end-pumped lasers, the relatively small resonator mode diameter mitigates the problems associated with the slow shutter speed and enhances the performance of the mechanical Q-switch. The versatility afforded by simply inserting the aperture blade in an operating CW laser to produce Q-switched output is compelling. Using a mechanical Q-switch, short pulse widths and high-peak power enhancement factors are obtained for a laser diode-pumped Nd:YAG laser. Thus, not only is the cost of the Q-switch reduced relative to AO Q-switches, but the pulse width can be shortened owing to the fact that the net gain is higher for the mechanical Q-switch. Therefore, shorter pulse widths can be obtained under similar pumping conditions and laser resonator configurations, in the case of a mechanical shutter operating as a intracavity Q-switch relative to that described in the patent by Kafka et al. cited above.

When the variable speed moving shutter is open, the laser resonator mode is not required to pass through a crystalline, amorphous or any other optical material that might otherwise be a part of a Q-switch. This is in contrast to AO or electro-optic Q-switch materials which introduce wavelength-dependent losses into the cavity even when they are open. The variable speed moving aperture introduces no such losses, nor does it require an expansion of the longitudinal dimensions of the compact laser cavity, which may have been optimized for operation without a Q-switch (cw). The variable speed moving aperture does not introduce wavelength-dependent reflection losses at each surface of a Q-switch transmission medium nor wavelength-dependent bulk scattering and absorption losses within a Q-switch transmission medium. Therefore, the wavelength operating range for the variable speed moving aperture operating as a Q-switch is virtually unlimited and can produce Q-switched pulses from the far infra-red to the far ultra-violet.

The gain element in the optical laser resonator cavity can be resonantly pumped or flash-pumped. The wavelength range over which the laser system operates in the Q-switched mode is determined by the type of dopant ions used in the laser gain element host, as well as by the reflective coatings and the transmission of the optical elements contained within the laser resonator cavity. Exemplary dopant ion types that can be used in solid state laser gain elements are $Er^{3+}$, $Ho^{3+}$, $Nd^{3+}$, $Cr^{3+}$, $Ti^{3+}$, or $Tm^{3+}$. In addition, other dopant or activator ion types which can be used are various ones of divalent transition elements $Mn^{2+}$, $Co^{2+}$, or $Ni^{2+}$; or quadrivalent $Cr^{4+}$, $V^{4+}$, metal ions; trivalent actinides ($U^{3+}$); or divalent rare-earth ions ($Sm^{2+}$, $Tm^{2+}$, and $Eu^{2+}$). Other ion types are envisioned in accordance with this inventive concept.

The design of the optical laser resonator cavity disclosed herein is generic and can be used in either laser systems with discretely tunable or continuously tunable gain media. In addition, the design of the optical laser resonator cavity disclosed herein could be used with crystalline or non-crystalline amorphous or glass-like gain media as well as liquid gain media such as dye lasers or chelate lasers, or gaseous gain media. The technique described herein is appropriate for both CW pumping and pumping by pulsed excitation.

Several embodiments of this inventive concept include a Nd:YAG gain element in the shape of a penta-prism. However, it is to be understood that other shapes for the gain element, for example, cylindrical rods, right-angled prisms, or zig-zag slabs, can be appropriately used with an intracavity variable speed moving aperture operating as a Q-switch. In addition, hosts other than YAG for the $Nd^{3+}$ ion, such as YLF, $YVO_4$, or other crystalline material hosts can be substituted in the gain element with comparable Q-switched results. Dopant ions other than $Nd^{3+}$ can be used with the YAG host or other crystalline or amorphous hosts to provide comparable Q-switched performance.

The variable speed moving aperture design is generic. In the preferred embodiments, it takes the form of a pair of matched circular discs with numerous slots as apertures. Discs rotate about an axis parallel to the laser resonator mode axis, producing alternately opaque and clear transmissive areas in the laser resonator mode axis. However, it is to be understood that other designs for the variable speed moving aperture may be used. These include, but are not limited to, vibrating knife edges, electrically driven "tuning fork" designs, photographic curtain-type shutters, or iris diaphragm-type shutters. Furthermore, any other mechanical means which allows rapid removal of a opaque beam block from the feedback path within the optical laser resonator are suitable for this Q-switched, diode-pumped laser design.

Figure 1A:
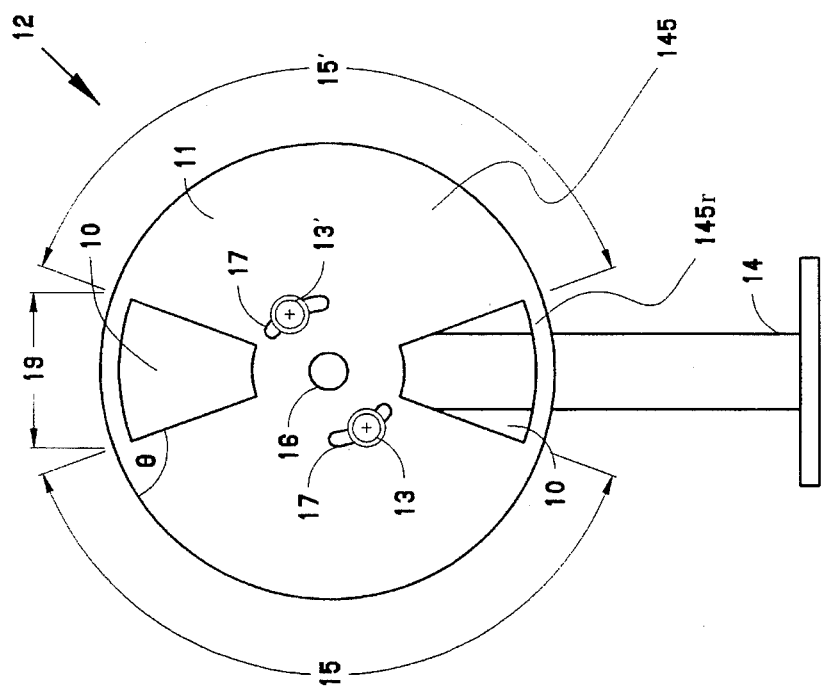
FIG. 1A illustrates a variable speed moving aperture apparatus.

Referring now to the drawings wherein like reference numerals designate identical or corresponding parts throughout the several views, FIG. 1A illustrates several components of an exemplary variable speed moving aperture Q-switch 12. An aperture blade 11 is supported by post 14 and is mounted to a variable speed motor (not shown) using screws 13 and 13' that extend through alignment slots 17. In this exemplary case, aperture blade 11 is fabricated in the shape of a thin, flat disc or wheel, and contains two open apertures 10. Other shapes for the aperture blade, or a fewer or greater number of apertures in the aperture blade can be used in accordance with this inventive concept.

A spindle 16 protrudes from the variable speed motor and may rotate, for example, at variable speeds up to 6,000 RPM. Spindle 16 can support two identical aperture blades for rotation simultaneously. An aperture blade 11', which is identical in dimensions to aperture blade 11, is illustrated in FIG. 1B. Alignment slots 17 and 17' provided in aperture blades 11 and 11', respectively, allow a selective location of aperture blade 11 with respect to identical aperture blade 11' when they are mounted on spindle 16. Aperture blades 11 and 11' are shown having two apertures each in this exemplary case. It is to be understood, however, that aperture blades with additional apertures, for example, 20 or 30 apertures, can be used.

Open apertures 10 represent transmissive portions of aperture blade 11, while the aperture blade structure 145 represents the opaque portion. Rim 145' provides structural integrity for aperture bled 11, and is important when thin disc-shaped aperture blades with numerous apertures are required. Open aperture 10 is bounded by opaque portion 145 and rim 145'.

Dimension 19, which is the maximum width of aperture 10, is proportionally reduced when more slots are located on an aperture blade. For the 6,000 RPM exemplary motor and the two exemplary apertures shown on aperture blade 11 in FIG. 1A, the maximum opening rate will be 200 Hz. For an aperture blade with 30 apertures, the maximum opening rate will be 3,000 Hz.

Variable speed moving aperture Q-switch 12 that is illustrated in FIG. 1A preferably has precise dimensions for each aperture 10. That is, width 19 and angle θ are preferably identical for both apertures 10 and 10' in aperture blades 11 and 11', respectively. In addition, perimeter dimension 15 preferably is the same as perimeter dimension 15' for aperture blades 11 and 11'.

To the extent that width 19, angle θ, and perimeter dimension 15 and 15' are not the same, jitter will be produced in the Q-switched pulse. That is, over the course of the 360° rotation of aperture blade 11, the Q-switched pulses will not be equally spaced in time. For the exemplary two-aperture blade shown in FIG. 1A, dimensional inaccuracies will cause unequal temporal separation between the two Q-switched pulses produced for each 360° rotation of aperture blade 11. In other words, the time elapsed between the emission of the first and second Q-switched pulses may be shorter or longer than the time elapsed between the second and third Q-switched pulses in the case where two Q-switched pluses are emitted per 360° revolution of exemplary aperture blade 11.

Inaccuracies in the rotational speed of the motor driving spindle 16 will also produce Q-switch timing jitter. It is important to note that nearly all Q-switches naturally produce some amount of timing jitter. That is, there is always some uncertainty in the pulse build-up time, which is the time between the opening of the Q-switch shutter and the emission of the Q-switched pulse. For many applications, a small degree of Q-switched pulse timing jitter does not present any difficulties other than those associated with triggering of an oscilloscope or other visual detection means. However, if the Q-switched pulse jitter is too severe, the pulse amplitude from Q-switched pulse to Q-switched pulse may be very different. This amplitude jitter may be unacceptable for certain applications.

Figure 2:
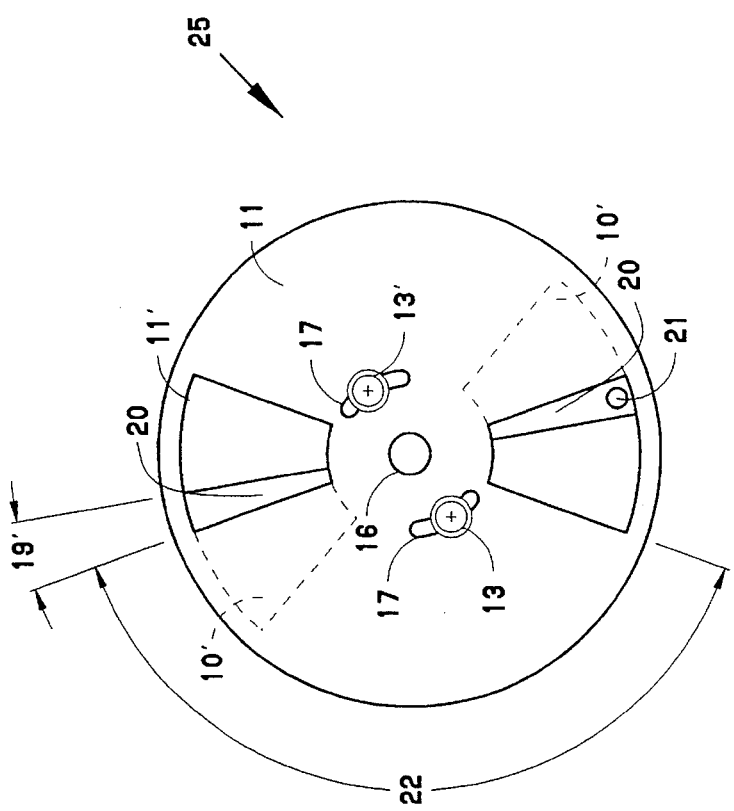
FIG. 2 illustrates an orientation of two identical aperture wheels.

Referring to FIG. 2, the relative orientation of aperture blades 11 and 11' is adjusted to produce two identical apertures 20. Aperture 20 is created by mounting aperture blades 11 and 11' onto spindle 16 and rotating aperture blade 11 with respect to aperture blade 11' to provide the desired clear aperture dimension 19'. The rotation of aperture blade 11 with respect to aperture blade 11' is facilitated by slots 17 and 17' on aperture blades 11 and 11', respectively Once the proper dimension for the maximum opening 19' of aperture 20 is obtained, exemplary screws 13 and 13' may be tightened. A precisely determined opening 19' is made with a standard feeler gauge that is inserted in the aperture prior to tightening screws 13 and 13'.

The mounted aperture blade aperture apparatus 25 includes aperture blades 11, 11', post 14, and spindle 16 attached to a high-speed motor with a variable speed attachment. The aperture apparatus is located in a resonator cavity of a laser such that laser resonator mode 21 is close to the outer edge of aperture blade 11. This location allows the part of aperture blade 11 that is moving the fastest to "slice through" laser resonator mode 21. Thus, the minimum Q-switch opening time is provided for a given rotation speed of aperture blade 11.

Dimension 19' is preferably adjusted to a size that is approximately two times the diameter of the laser resonator mode at the point where the variable speed moving aperture cuts the laser resonator mode. This dimension provides a compromise between the diffraction losses introduced by aperture 20 and the prevention of subsequent Q-switched pulses that may be produced as a result of the Q-switch opening time being too long. This trade-off is required only for the case where the laser gain element is pumped continuously.

In the case where a single excitation pulse is produced prior to the opening of the Q-switch, the maximum size of aperture dimension 19' should be several times the laser resonator mode diameter where the variable speed moving aperture is inserted. In this case, diffraction losses can be eliminated without regard to additional Q-switched pulses being emitted. However, the aperture dimension 19' should not be so wide that opaque region 22 does not block the feedback path for a time at least as long as the length of the excitation pulse.

Figure 3:
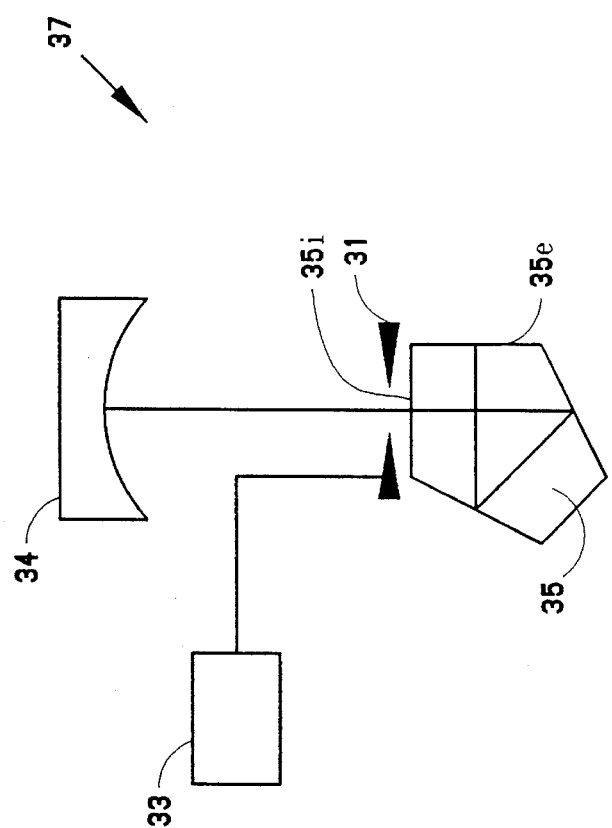
FIG. 3 illustrates the concept of a Nd:YAG laser with a variable speed moving aperture capable of performing as an intracavity Q-switch.

Referring to FIG. 3, a penta-prism shaped Nd:YAG laser gain element 35 is diode pumped (not shown and aligned with an output mirror 34 to produce a nearly hemispherical laser resonator mode. Exterior face 35e of laser gain element 35 is coated HR for 1.06 μm in this exemplary case, interior face 35i of laser gain element 35 is coated AR (anti-reflective) at 1.06 μm, and output mirror 34 is coated to be partially reflective at 1.06 μm. The location of the intracavity variable speed moving aperture apparatus 31 is as close to interior face 35i as is practical. Typically, the separation between variable speed moving aperture apparatus 31 and interior face 35i of laser gain element 35 is less than 1 mm.

Variable speed moving aperture apparatus 31 includes two matched aperture blades that are attached to a variable speed motor and mounted on a post. The elements of the variable speed moving aperture were described in relation to FIGS. 1A, 1B and 2. The two aperture blades are driven by a precision variable speed motor. The term "precision" is used to identify the extremely low jitter in rotation rate. Preferably, the motor should be capable of achieving a set rotation rate and deviation from the set rate should be less than 0.1%.

In this exemplary case the rotation rate of the motor could vary from 0 RPM to 6,000 RPM (0 to 100 Hz). The rotation rate is controlled by an interconnected electronics package 33 which may include a digital readout of the shutter frequency and a potentiometer to adjust the motor revolution rate. Aperture blades containing between 2 and 30 apertures allowed a maximum repetition rate of 3 kHz in this exemplary case. The diameter of these aperture blades were approximately 98 mm, and the ratio of opaque to transparent area for any given aperture blade was 1:1.

Figure 4:
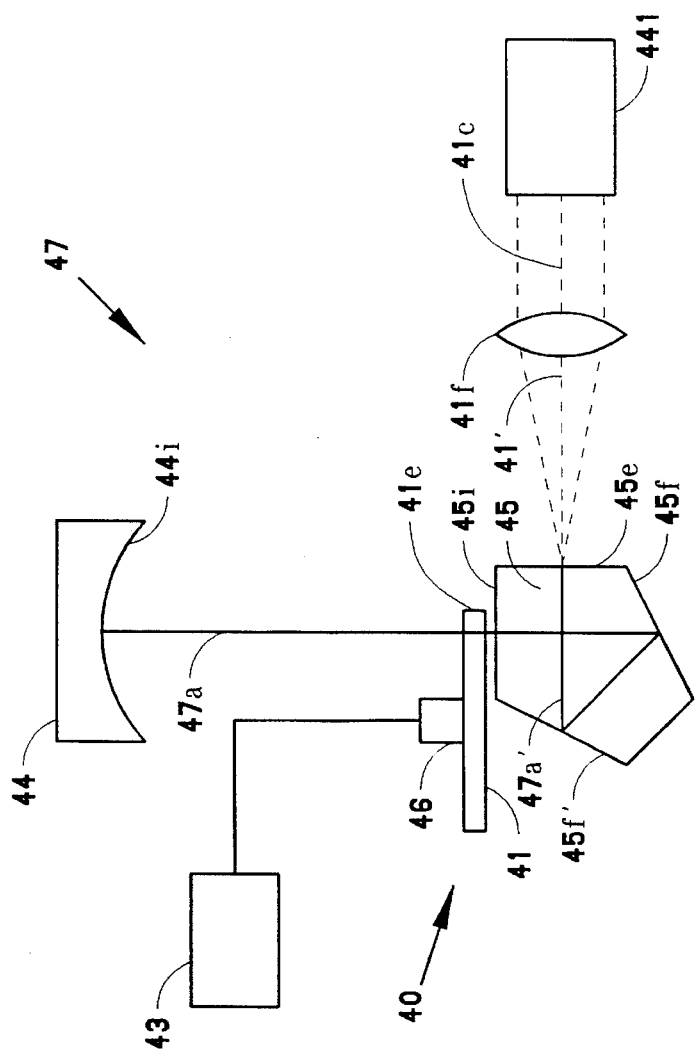
FIG. 4 illustrates a first embodiment of this inventive concept.

FIG. 4 shows the top view of a first embodiment of the repetitively Q-switched laser that is pumped by laser diodes and Q-switched with an intracavity variable speed moving aperture. A Nd:YAG laser gain element 45 is fabricated in the shape of a penta-prism, and an output coupler 44 is aligned and disposed to form a nearly hemispherical laser resonator mode located at exterior face 45e. Exterior face 45e of laser gain element 45 is coated HR for 1.06 μm and serves as an HR flat reflector. Exemplary output coupler mirror 44 may have a 10 cm radius of curvature that is concave on interior face 44i. Interior face 44i is coated to be partially reflective at 1.06 μm in this exemplary case, and fold faces 45f and 45f' are coated for high reflectivity at an exemplary 1.06 μm. An aperture blade 41 of a variable speed moving aperture apparatus 40 is disposed within laser resonator cavity 47 at a spacing of approximately 1 mm from interior face 45i of laser gain element 45. Variable speed motor 46 rotates aperture blade 41 about an axis parallel to laser resonator mode axis 47a. Electronics package 43 drives and controls the rotational speed of variable speed motor 46.

At a motor speed of 6,000 RPM the linear velocity of an exemplary 98 mm diameter aperture blade 41 near outer edge 41e is $3.1 \times 10^3$ cm/s. Thus, approximately 32 ns are required for outer edge 41e of aperture blade 41 to traverse 1 μm. The frequency of rotation for aperture blade 41 is determined by an optical emitter such as an LED or low power laser diode and a detector which are integrated within the motor support structure (not shown). This provides an accurate readout of the aperture opening frequency for electronics package 43.

Laser diode 441 emits a collimated beam 41c at an exemplary wavelength of 808.5 nm. Focusing lens 41f is disposed to focus the emission from laser diode 441 onto exterior face 45e of laser gain element 45. Laser diode 441 and focusing lens 41f are disposed to produce a pump mode waist that substantially matches the diameter of the laser resonator mode waist near exterior face 45e of laser gain element 45. Upon passing into laser gain element 45, the pump flux contained in focused pump beam 41' propagates collinearly with laser resonator axis 47a'. The operation of a penta-prism shaped Nd:YAG laser is described in more detail in a patent by R. Scheps, U.S. Pat. No. 5,249,196.

The exemplary output power of laser diode 441 is 1 W. By matching the pump waist with the laser resonator mode diameter, a $TEM_{00}$ laser output beam can be produced. The laser resonator mode waist at exterior face 45e of laser gain element 45 is 40 μm in diameter. The beam path in laser gain element 45 between exterior face 45e and interior face 45i is an exemplary 17 mm. The laser resonator mode diameter at aperture blade 41 in laser resonator cavity 47 is 248 μm.

Figure 5:
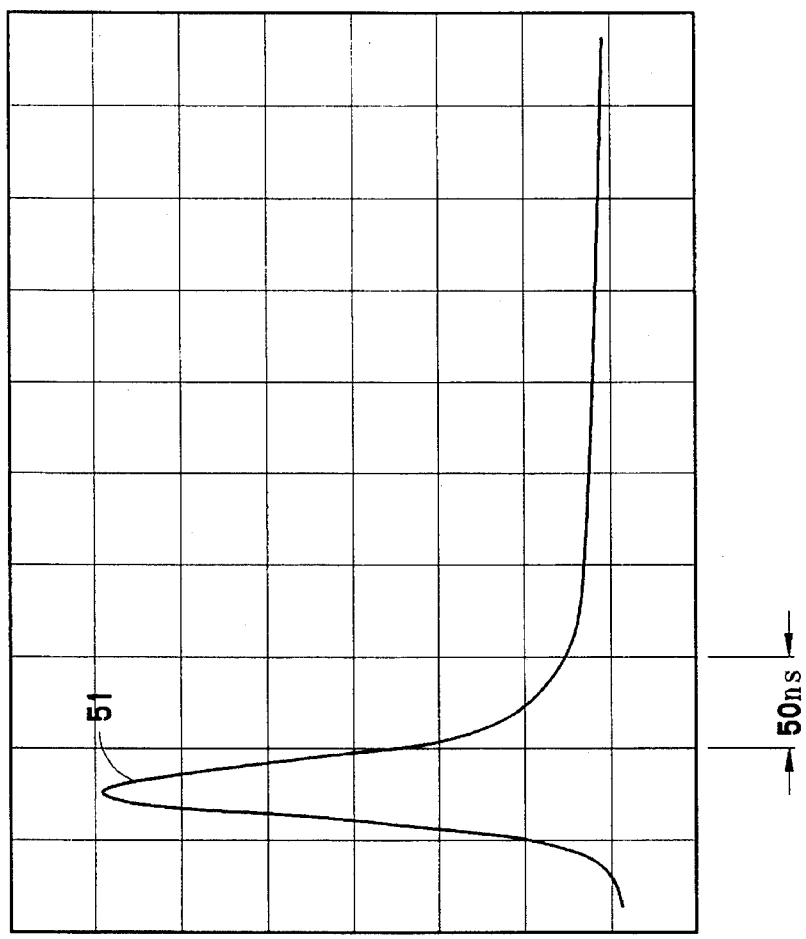
FIG. 5 illustrates a Q-switched waveform for a diode-pumped Nd:YAG laser.

An example of the Q-switched output pulse obtained from the embodiment illustrated in FIG. 4 is shown in FIG. 5. Output trace 51 is recorded on an oscilloscope and shows the temporal evolution of the Q-switched pulse. The exemplary absorbed pump power is 822 mW. The output coupler mirror reflectivity is 86% and the pulse width in this exemplary case is 35 ns. The pulse width obtained using the first embodiment of this inventive concept illustrated in FIG. 4 is substantially shorter than those obtained using an AO Q-switch under similar pump conditions.

The gain and loss of the laser resonator illustrated in FIG. 4 can be determined in a well-known manner from a Findlay-Clay analysis. Using the resulting gain and loss values, the Q-switched pulse width $t_p$ can be calculated from the expression $$t_p = t_c \frac{(n_i - n_f)}{\left(n_i - n_t \left[1 + \ln\left(\frac{n_i}{n_t}\right)\right]\right)} \quad (1)$$

where $n_i$ and $n_f$ are the initial and final population inversion densities, respectively, and $n_t$ is the threshold inversion density. The photon decay time $t_c$ is given by $$t_c = \frac{t_r}{\left[\ln\left(\frac{1}{R}\right) + L\right]} \quad (2)$$

where R is the output mirror reflectivity, L is the round-trip passive loss (excluding output coupling) and $t_r$ is the round-trip transit time. Both $n_i$ and $n_t$ can be obtained from the small 4 signal gain at the appropriate pump flux since $$n = \frac{g_0}{\sigma} \quad (3)$$

where $g_0$ is the small signal gain coefficient and $\sigma$ is the stimulated emission cross-section. The final population inversion is related to $n_i$ and $n_t$ by the transcendental equation $$n_i - n_f = n_t \ln\left(\frac{n_i}{n_f}\right). \quad (4)$$

The fraction of the inversion remaining after the Q-switched pulse, $n_f/n_i$ is inversely dependent on the ratio of the initial inversion to the threshold inversion. This ratio is identical to the ratio of the pump fluence to the threshold pump fluence (referred to as the "pump ratio"), see Eq. 3. This conclusion can also be reached by noting that for a four-level laser where the intracavity fluence is negligible (as it is when pumping with the shutter closed) the rate equation for the population of the upper laser level $n_2$ is $$\frac{dn_2}{dt} = W_p n_0 - \left(\frac{n_2}{\tau}\right) \quad (5)$$

where $W_p$ is the pump rate for population of the upper laser level, $n_O$ is the population of the ground state, and $\tau$ is the spontaneous decay rate from the upper laser level. For a 200 Hz Q-switching rate, the pump integration time is long relative to the upper laser level spontaneous emission lifetime, so that the upper laser level population is in the steady state. The $n_2$ steady state population is given by $$n_2 = W_p n_0 \tau \quad (6)$$

and it is apparent that the upper laser level population is proportional to the pump flux.

The transcendental function given in Eq. 4 can be used to calculate the theoretical Q-switched pulse width. Pulse widths obtained by the intracavity variable speed moving aperture are comparable to the calculated Q-switched pulse widths when the shutter opening time is short relative to the pulse build-up time.

The pulse build-up time is the delay between the time the shutter opens and the time that the Q-switched pulse is emitted by the laser. The build-up time represents the time required for the intracavity optical circulating fluence to build up from spontaneous fluorescence noise. This build-up time is a function of the gain, loss and output coupler reflectivity of the laser resonator cavity among other parameters of the laser. However, it is not always the case with a mechanical Q-switch that the shutter opening time is short relative to the pulse build-up time. At the time that the Q-switched pulse is emitted, the aperture-induced passive loss may not be completely removed. This would lead to a higher value for $n_t$ than the steady state value.

To determine the appropriate conditions for using an intracavity variable speed moving aperture to obtain Q-switched pulse widths as short as those calculated using Eqs. 1 and 4, two different measurements were performed with a knife edge. These measurements were designed to determine the appropriate laser optical resonator design as well as the appropriate mode diameter, pump fluence, beam dimensions, motor speeds, and other parameters of the laser and the aperture apparatus which strongly determine the ultimate performance and effectiveness of the variable speed moving aperture Q-switch. In the first knife edge measurement, the laser was pumped CW and the knife edge was gradually moved into the laser resonator mode at the axial position previously occupied by the variable speed moving aperture. The laser output power was monitored as a function of the knife edge position. This procedure was repeated for several different pump powers and output couplers, and a typical plot of the output power as a function of knife edge position is illustrated in FIG. 6.

Figure 6:
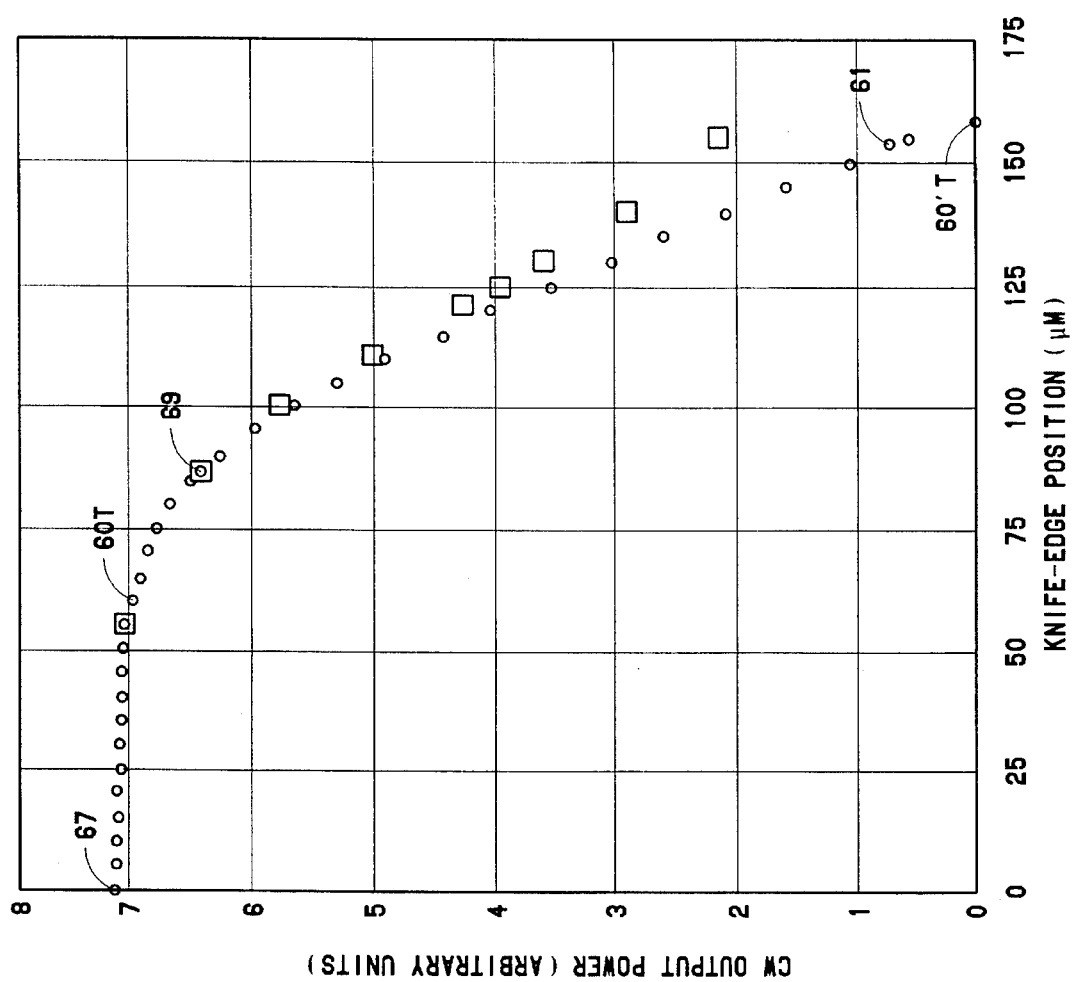
FIG. 6 illustrates the output power from a diode-pumped Nd:YAG laser as a function of a knife-edge position inside the cavity.

Referring to FIG. 6, the power units are arbitrary and the zero position corresponds to the knife edge removed from the beam. Data point 61 represents the location of the knife edge where the laser output is 10% of the maximum output power. Data point 69 represents the location of the knife edge where the laser output power is 90% of the zero position power. The termination data points 60'T and 60T represent the distance traversed by the knife edge as it moves from threshold to the 98% output power position, respectively. The open circles are the knife edge data and the calculated points representing the power dependence as a function of knife edge position are indicated with open squares.

Data plots similar to that shown in FIG. 6 were obtained for other output mirrors with different reflectivities. The distance traversed by the aperture edge as it scans from the threshold location that is represented by data point 60'T (where the gain is equal to the loss) to the location that is represented by data point 67 where the aperture is completely open is approximately 160 μm in this exemplary case.

A "characteristic distance" can be defined that is the distance the knife edge must move between the 10% and 90% power points. In FIG. 6 this is the distance the knife edge must move to increase the power from location 61 to 69. The characteristic distance was found to be similar for all mirrors and had an average value of 67 μm when the laser gain element was pumped at the "optimum pump power" as defined by J. J. Degnan, "Theory of the Optimally Coupled Q-Switched Laser," *IEEE Journal of Quantum Electronics*, vol. 25, pp. 214–220, 1989. The characteristic distance remains constant despite the variation in the output coupler reflectivity since the pump power is increased as the reflectivity is decreased to compensate for the increased mirror transmission. This is a result of using the optimum pump power. The resonator mode is observed to remain $TEM_{00}$ as the knife edge is introduced into the resonator and no eclipsing of the mode is observed. This is expected for a stable resonator. Note that the concept of optimum pump power is based on the intrinsic gain and loss of the laser gain element and the output mirror reflectivity. Once these factors are determined there is an optimum pump power which provides the highest efficiency operation and the narrowest obtainable Q-switched pulse width. The optimum pump power provides the optimum performance for a CW pumped, Q-switched laser.

The results of the first knife edge measurement can be used to calculate the insertion loss of the knife edge as a function of knife edge position. However, a second set of measurements was undertaken to provide this data directly. Initially, the laser was pumped with just enough power to exceed threshold with no knife edge inserted into the cavity. The knife edge was then moved into the laser resonator to extinguish the laser emission. The pump power was subsequently increased by 20 mW and the knife edge was moved further into the resonator to once again extinguish the laser output. This procedure was repeated with 20 mW increments in absorbed pump power until the optimum pump power was applied. Since at threshold the gain equals the loss, and furthermore, the gain is equal to the small signal gain (as opposed to the loaded gain), the insertion loss introduced by the knife edge can be determined at each position using the Findlay-Clay curve-fit parameters.

Figure 7:
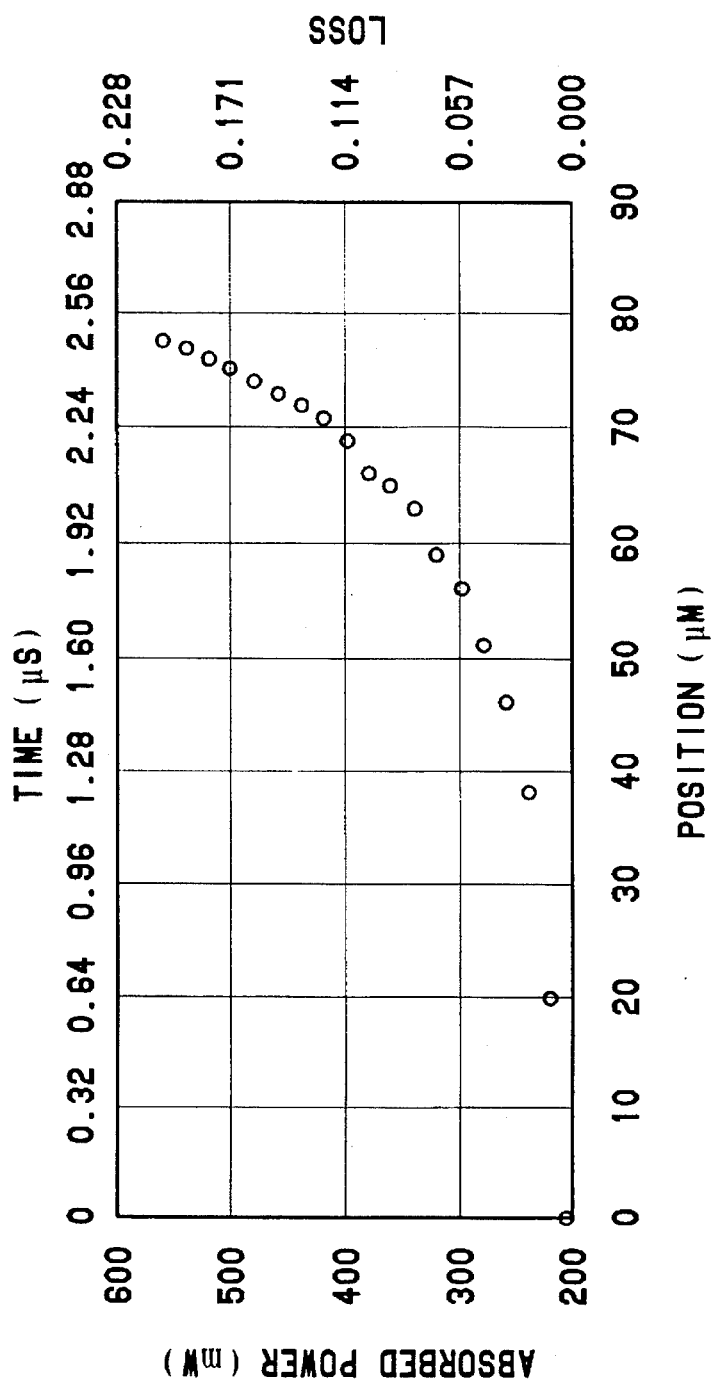
FIG. 7 illustrates the knife-edge travel distance required to extinguish laser output as a function of the absorbed pump flux.

A typical trace of the threshold pump power as a function of knife edge position is shown in the graph of FIG. 7. In this figure, the zero position corresponds to the knife edge location required to extinguish laser output at the threshold pump power and indicates the practical edge of the resonator mode. Increasing position for the knife edge corresponds to the knife edge penetrating deeper into the resonator mode. The numbers on the alternate axis to the right and above the graph of the figure indicate the insertion loss and transit time, respectively, for the variable speed moving aperture operating at a motor speed of 100 Hz in this exemplary case. The alternate axes are configured to indicate increasing insertion loss as a function of time and therefore represent closing of the shutter. The alternate axes in FIG. 7 show that the data, illustrated with open circles in this figure, represent the temporal dependence of the aperture blade insertion loss for the laser illustrated in FIG. 4.

For slow Q-switch repetition rates, CW pumping of the exemplary Nd:YAG laser becomes relatively inefficient. For example, at a Q-switch repetition frequency of 200 Hz the excitation integration time represents approximately 11 radiative decay times for the $Nd^{3+}$ ion. To achieve higher optical conversion efficiency, the laser gain element should be pumped in a pulsed mode that is synchronized with the opening of the shutter. Flashlamp repetition rates are limited practically to approximately 100 Hz and more realistically only 20 Hz. Therefore, efficient Q-switched operation at repetition rates between approximately 20 Hz and 5,000 Hz can best be obtained by pumping with pulsed laser diodes.

Laser diode pump sources have the property of being able to turn and off very rapidly and can operate at duty cycle ranges from 0% to 100%. The duty cycle represents the laser diode on-time as a fraction of the on-time plus off-time. The electrical drive current for the pump source is turned on and off just prior to each Q-switched pulse. As a consequence, the overall electrical-to-optical conversion efficiency for a pulsed laser diode-pumped laser using a variable speed moving aperture as a Q-switch can be extremely high.

Figure 8:
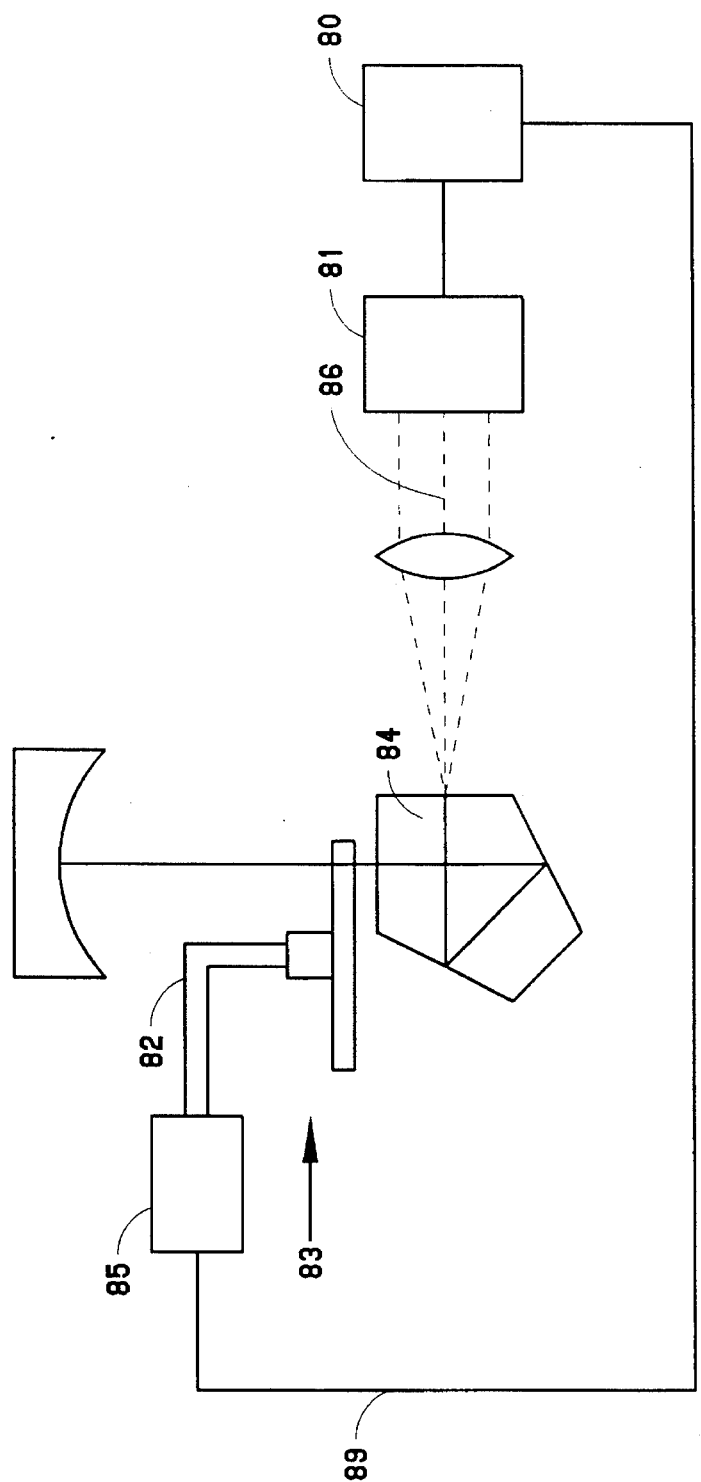
FIG. 8 illustrates a second embodiment of this inventive concept.

A second embodiment of this inventive concept is illustrated in FIG. 8. In this case, variable speed moving aperture apparatus 83 is driven by electronics package 85. Variable speed moving aperture apparatus 83 produces an optical trigger that is generated for example by an LED and a photo diode. When the shutter first opens, an optical pulse is transmitted to the photo diode which produces an electrical pulse that is transmitted along cable 82 to electronics package 85. Electronics package 85 then sends a sync pulse along cable 89 to laser diode driver 80. Laser diode driver 80 provides a pulse of electrical current to laser diode 81, which emits an optical pulse 86. The electrical pulse width emitted by laser diode driver 80, and hence the optical pulse width emitted by laser diode 81, are determined by the operator. The width, or duration, of the optical pulse should be adjusted to a time equal to less than twice the fluorescence lifetime of the dopant ions contained in penta-prism shaped gain element 84. Laser diode driver 80 may introduce an adjustable delay. As a result, the timing of the electrical pulse produced by laser diode driver 80 may be a function of the time of arrival of the sync pulse along cable 89 plus the adjustable delay.

Figure 9:
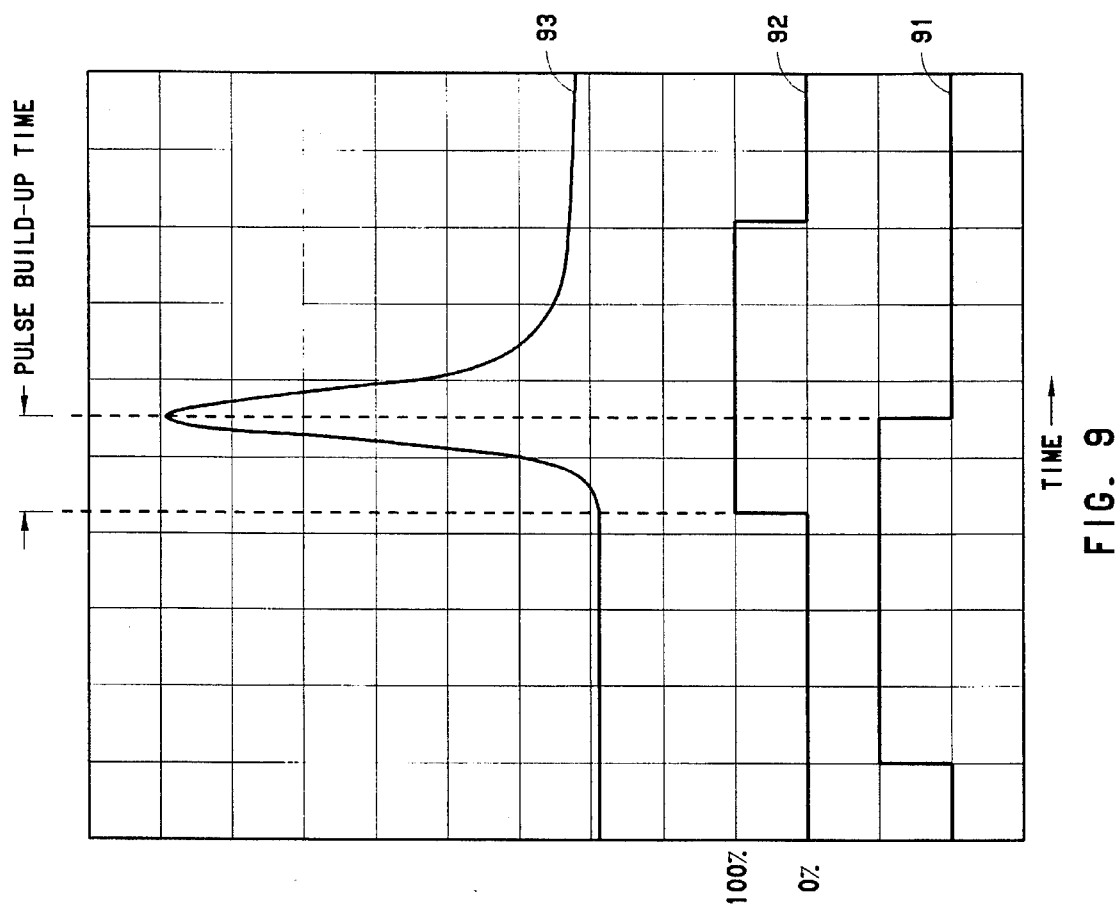
FIG. 9 illustrates a schematic representation of the temporal relationship between the Q-switched output pulse, the laser diode pump pulse, and the mechanical aperture opening.

FIG. 9 shows a typical schematic timing sequence. Trace 91 represents the optical pump pulse which begins prior to the opening of the aperture and lasts for approximately 1 to 2 fluorescence lifetimes. Curve 92 represents the translation of an aperture of the variable speed moving aperture apparatus 83 from a closed to an open position. It can be seen that the shutter opens before the time that the pump pulse terminates. Curve 93 represents the laser output pulse. The pulse is a narrow Q-switched pulse that is emitted some time after the aperture is open. The delay between the initial opening of the aperture and the emission of the Q-switched pulse is due to the pulse build-up time. For optimum efficiency, the termination of the laser diode pump pulse 91 is adjusted to occur at the time that the Q-switched pulse 93 is emitted.

Laser performance using pulsed pumping was evaluated as a function of pump pulse width and timing of the pump pulse relative to the opening of the shutter. This was performed with five different reflectivity output mirrors. Throughout these measurements, the laser diode was maintained at a fixed wavelength of 808.5 nm by thermal control of the laser diode heat sink. The laser diode output was continuously monitored with an optical multi-channel analyzer. The results obtained using pulsed pumping with a 0.898 reflective (R) mirror for the embodiment illustrated in FIG. 8 are given in the table below.

| Pump Pulse Width µs | Q-switched Pulse Width ns | Pulse Amplitude V | Average Power mW |
|---|---|---|---|
| 150 | 140 | 92 | 0.4 |
| 200 | 72 | 240 | 0.7 |
| 250 | 53 | 300 | 1.2 |
| 300 | 44 | 300 | 1.4 |
| 350 | 47 | 321 | 1.5 |
| 400 | 42 | 312 | 1.5 |
| 450 | 42 | 306 | 1.5 |
| 500 | 42 | 312 | 1.5 |

For the 0.898 R mirror the threshold pulse width is 122 µs. The threshold pulse width increases for increasing transmission of the output mirror. The pulse amplitude listed in the table represents the peak signal from a monitor photo diode (not shown) and provides a relative measure of the peak power. The excited state fluorescence lifetime of $Nd^{3+}$ ions in YAG is approximately 230 µs. It can be seen that for pump pulse widths of 250 to 350 µs, narrow Q-switched pulse widths and high average powers are obtained.

Pulse timing is an important factor that directly affects the Q-switched power. Optimum efficiency can be achieved when the termination of the pump pulse coincides temporally with the emission of the Q-switched pulse. This was observed for all pulse widths so that longer pump pulses require initiation earlier relative to the opening of the Q-switch aperture. Extending the excitation pulse beyond the time that the Q-switched pulse is produced increases the average power by producing steady state laser output subsequent to the Q-switched pulse. However, the Q-switched peak power remains fixed at a value determined by the pump pulse width up to the pulse emission time.

The delay between the initial opening of the shutter and the emission of the Q-switched pulse is referred to as the pulse build-up time and the pulse timing data indicate that pump fluence is integrated during the build-up time. Terminating the excitation pulse prior to the Q-switched output pulse produces lower peak and lower average output powers. At higher pump fluence, secondary low power Q-switched pulses are observed to follow the main Q-switched pulse. Extending the pump pulse excitation beyond the emergence of the main Q-switched pulse does not affect the amplitude or timing of these secondary pulses. Since the secondary pulses typically follow the main Q-switched pulse by only a few μs, the additional pumping that takes place during this time scale has little observable effect on the secondary output pulse.

With an opaque to transparent aperture ratio of 1:1 for the aperture blade, the aperture is open long enough under CW pump excitation to allow low power, steady state, laser emission following the Q-switched pulse. This output terminates when the aperture closes. While this steady state emission is normally not a problem, if not recognized it can lead to erroneous conclusions about the Q-switched average power. That is, the measured average power consists of the combination of Q-switched and steady state output. The steady state output is simple to eliminate by using a smaller aperture. The Q-switched peak output was measured as a function of aperture width and was found to be unaffected down to widths of approximately 500 μm (approximately twice the beam diameter). At this width, virtually all of the steady state output is eliminated. Average power measurements where therefore taken with a 500 μm aperture width to provide an accurate determination of the Q-switched average power.

The Q-switch opening time as it relates to a mechanical shutter in accordance with this inventive concept is different than the opening time for an AO Q-switch. In the case of an AO Q-switch, the opening time refers to the time required for the acoustic wave to traverse the $1/e^2$ beam diameter. This time directly affects the Q-switched output pulse width.

For the mechanical moving aperture, however, the relevant distance required for the aperture edge to move in order to open is that distance between a first position where the laser resonator loss is equal to the gain and a second position at the extreme edge of the resonator mode. The first position occurs at the 160 μm location labeled 60'T in FIG. 6 for the embodiment illustrated in FIG. 4. The practical limit for the second position is more difficult to assign. The 98% power transmission point is arbitrarily selected. The completely open position occurs near the 55 μm location labeled 60T in FIG. 6. The distance required for the aperture to travel in order to open is a function of the pump power, the resonator beam diameter at the aperture blade location, and the output coupler reflectivity. When these parameters are varied, the shape of the curve remains similar to that shown in FIG. 6, but the absolute values along the two axes change. For the case shown in FIG. 6, the opening distance based on the 98% transmission point is 105 μm.

The losses introduced by the aperture blade are due to both attenuation and diffraction. The attenuation losses can be calculated using the gaussian error function. However, the measured output beam intensity profile of the laser illustrated in FIG. 4 is not exactly gaussian. Therefore, a commercially available beam diagnostic program was used to digitize the beam emerging from the resonator. A computer program that does not include diffractive losses was used to calculate the transmission of this beam through the aperture of the aperture blade. The calculated transmission function was doubled to reflect the intracavity use of the aperture. The aperture insertion loss δ reduces the laser output power as $$\frac{P}{P'} = \frac{\delta + T + L}{T + L} \tag{7}$$

where T is the mirror transmission and P' and P are the laser output powers with and without insertion loss δ, respectively. Eq. 7 is valid for high pump ratios and small δ/(T+L). The calculated power dependence as a function of aperture position is shown in FIG. 6 with open squares. It can be seen that as the knife edge is inserted deeper into the resonator mode, the deviation between the measured and calculated power increases. This is due in part to the increased diffractive losses.

The aperture opening time for the 105 μm opening distance is 3.4 μs in this exemplary case. To determine the impact of the opening time on the Q-switched output, the pulse build-up time must be known. The pulse build-up time is a function of the Q-switch repetition rate, the ratio of the pump fluence to the threshold pump fluence, the passive loss, and the cavity length. The pulse build-up time may be determined from calculations published by R. B. Chesler, M. A. Karr, and J. E. Geusic, in "An Experimental and Theoretical Study of High Repetition Rate Q-switched Nd:YAlG Lasers," *Proceedings of the IEEE*, vol 58, pp. 1899–1914, 1970. For the pump ratios used in this work, the calculated pulse build-up times range from 1.9 μs for an exemplary 0.860 R mirror, to 13.3 μs for an exemplary 0.959 R mirror. For pulse build-up times much longer than the opening time the cavity losses will be minimized when the Q-switched pulse is emitted. In addition, the peak output power will be at a maximum.

For shorter build-up times, however, the losses are not minimized when the Q-switched pulse is emitted and lower peak power, lower efficiency, and the appearance of secondary Q-switched pulses are among the consequences of operating in this regime. In addition, build-up times shorter than the aperture opening time prevents very short pulse width production using the variable speed moving aperture Q-switch. It is important to note that the opening time for the mechanical aperture depends on the pump power. Lower pump power leads to shorter opening times since the insertion loss required to turn the laser off is lower and therefore requires less penetration by the aperture edge into the resonator mode. Secondary peaks are rarely observed at low pump power.

Each data point illustrated in FIG. 7 corresponds to the position of the knife edge required to introduce an incremental 1.1% round-trip loss. As the knife edge penetrates deeper into the nearly gaussian resonator mode, the distance required for the knife edge to move to introduce a constant incremental loss decreases. The data illustrated in FIG. 7 indicate that approximately 78 μm of motion are required for the knife edge to move from the edge of the beam to the position where sufficient losses are introduced to eliminate laser operation when pumped with 562 mW. The introduced round-trip loss at full pump power is 0.20.

The opening distance determined by this type of knife edge measurement is more reliable than that represented in FIG. 6. When the knife edge is near the edge of the resonator mode the scatter of the data and the oblique slope obtained for the measurements limits the accuracy of the determination of the 98% power transmission point. Elimination of the laser output at threshold as performed in the measurement represented in FIG. 7 provides a more definite determination of the beam edge. When the output mirror reflectivity was varied between 0.86 R and 0.994 R, the opening distance measured for the aperture ranged from 65 µm to 85 µm and gave a range of opening time from 2.1 to 2.7 µs with the 98 mm exemplary aperture blade.

The operation of the mechanical aperture in either a CW or pulsed-pumped laser can be described as follows: when the opaque region of the aperture blade prevents feedback, the gain medium absorbs pump-light and the upper laser level population eventually reaches steady state. As the shutter begins to open the insertion loss decreases, eventually reaching a point where the loss equals the gain. This is the point where the Q-switch is considered to be open. As the aperture continues to open the intracavity flux begins to build up exponentially. The losses are further lowered during this pulse build-up time. Depending upon the length of the build-up time, the aperture blade may not be completely out of the beam when the Q-switched pulse is emitted. Referring to FIG. 7, for example, it can be seen that the initial insertion loss reduction as a function of time is large. However, the removal of the last 2% of insertion loss requires that the aperture travel almost half of the total opening distance.

From Eq. 7 it can be seen that residual losses of only 1 to 2% can have a significant impact on the output power. If the Q-switched pulse is emitted prior to the complete opening of the shutter, the population inversion remaining after the emission of the initial Q-switched pulse may be high enough to allow the production of one or more additional pulses. A secondary pulse is produced as the intracavity loss continues to be reduced due to the progressive opening of the shutter. Note that the slower the aperture opening time relative to the build-up time, the higher the intracavity losses at the time the initial Q-switched pulse is emitted. The Q-switched pulse dynamics were discussed and calculated by J. E. Midwinter, "The Theory of Q-switching Applied to Slow Switching and Pulse Shaping for Solid State Lasers," *British Journal of Applied Physics*, vol. 16, pp. 1125–1133, 1965.

The pulse build-up time increases as the pump ratio and cavity losses decrease. However, the pump ratio increases as the cavity loss decreases due to the decreasing threshold pump power requirements. The decrease in cavity loss due to the gradual withdrawal of the opaque part of the aperture from the beam therefore results in two simultaneous, competing factors that affect the time dependent build-up time. The build-up time is linearly dependent on the loss, but inversely dependent on approximately the square of the pump ratio in the region of interest. Therefore, the build-up time typically is long at the time the shutter first opens, but gradually gets reduced as the opaque part of the aperture continues to move out of the beam. As was mentioned, the Q-switch opening times for all the mirrors are similar under optimum pump power conditions.

Q-switched pulse widths almost two orders of magnitude shorter than the Q-switch opening time can be obtained. This is a remarkable feature associated with the use of a mechanical aperture as a Q-switch. Substituting an AO Q-switch for the mechanical variable speed moving aperture produced pulse widths greater than 100 ns due to the large beam diameter at the Q-switch crystal. The enhancement factors for all but the highest reflectivity output mirrors were in the range of 300 to 400. The enhancement factor is the ratio of the peak to average output power. When the Q-switch repetition rate is lowered by reducing the rotation rate of the motor, the opening time increases, increasing the pulse width and reducing the peak power. In addition, the output typically contains secondary Q-switched pulses. If desired, in some cases it is possible to remove the secondary pulse by reducing the aperture width. It is therefore desirable to operate the motor at the maximum speed, and adjust the Q-switch repetition rate by adjusting the number of apertures on the aperture blade. For example, using a motor speed of 100 Hz, a 30-aperture blade produces a Q-switch rate of 3 kHz. If a rate of 2 kHz is desired, it is preferable to replace the aperture blade with one containing 20 apertures rather than slowing the motor down to 67 Hz.

For pulsed pumping, a Q-switched Nd:YAG laser pumped with excitation pulse widths of approximately 250 µs can produce efficient Q-switched operation at relatively low Q-switch rates without sacrificing optical conversion efficiency. Since laser diodes are simple to convert from CW to pulsed operation, the diode-pumped Q-switched laser can be made to perform efficiently over a wide range of repetition rates.

The insertion loss introduced by the aperture blade is essentially zero when the aperture is open. However, Q-switching with the aperture blade can introduce a certain degree of inefficiency that has the same effect as insertion loss in terms of limiting the maximum average power. The source of inefficiency is the residual population inversion that is not extracted if the opening time is slow relative to the pulse build-up time. This inefficiency can be contained by controlling the Q-switch opening time relative to the pulse build-up time. The former is controlled by the revolution rate of the motor, the radial position on the aperture blade where the aperture intersects the resonator mode beam, and the resonator mode beam diameter at the aperture.

By proper design of the laser resonator, a mechanically Q-switched laser can operate efficiently over a wide range of parameters. The mechanical Q-switch is inserted into an operating CW cavity and turned on. As a demonstration of the versatility of the mechanical Q-switch, this device was used with a Yb:FAP laser. The laser gain element was fabricated in the shape of a cylindrical rod and a nearly hemispherical laser resonator mode was established within the laser resonator cavity. The mechanical aperture was located at a position as close as possible to the gain element where the laser resonator mode beam diameter was approximately 200 µm. The Q-switched pulse widths were 160 ns at lower pump power but decreased to 28 ns when pumped with 500 mW of pump power.

The key parameters that must be adjusted to produce efficient Q-switched operation of a laser diode-pumped laser which uses a variable speed moving aperture as a Q-switch are: the pump power, the laser resonator mode beam diameter at the location of the aperture, and the aperture opening time. The pulse build-up time should exceed the aperture opening time. The aperture opening time is determined by the linear velocity of the aperture as it slices through the laser resonator mode, the laser resonator mode diameter, and the intensity profile of the laser resonator mode. For best operation the laser resonator mode should be a gaussian $TEM_{00}$ mode. Very small laser resonator mode diameters can be created by using a nearly hemispherical laser resonator configuration. Aperture blades of reasonably large diameters are rotated at high revolution rates to reduce the aperture opening time. On the other hand, the pulse build-up time increases as the pump flux decreases so that for any given aperture opening time there is a maximum pump power limitation. However, referring to the "optimum pump power" defined by the work of Degnan cited previously, if this maximum pump power is greater than the optimum pump power, then the ideal conditions exist for the use of a mechanical moving aperture as a Q-switch.

Put another way, the interaction between the mechanical aspects of the aperture blade including rotation rate and aperture width, and the resonator parameters including gain, loss, beam diameter, cavity length, and pump power, should be considered for effective use of the mechanical Q-switch. With appropriate design, the mechanical aperture can operate efficiently over a wide range of laser parameters. These parameters may be determined for any gain element, output mirror reflectivity, pump fluence, and mechanical moving aperture parameters as described in detail in the foregoing discussion. A key factor for efficient Q-switch performance is to operate with a short opening time relative to the pulse build-up time. A definition of the Q-switch opening time has been provided above, and the exact temporal dependence of the aperture insertion loss was presented for an exemplary longitudinally pumped Nd:YAG laser. In this light, it can be seen that the most efficient use of the variable speed moving aperture will be by maintaining the motor revolution rate at or near its maximum speed. The Q-switched rate can be adjusted by the selection of the number of apertures on the aperture blade. For example, with a motor rotation rate of 100 Hz, a two-aperture blade produce a Q-switched pulse rate of 200 Hz, while a 30-aperture blade produces a Q-switched pulse rate of 3 kHz.

The Q-switched output characteristics of a laser obtained with a mechanical moving aperture, such as the pulse width, average power, enhancement factor and peak power, can exceed those achieved for AO Q-switches. Therefore, the mechanical moving aperture, when utilized properly in a laser diode-pumped laser, is a convenient, efficient, and pragmatic means of demonstrating repetitively Q-switched operation for an end-pumped laser.

Figure 10:
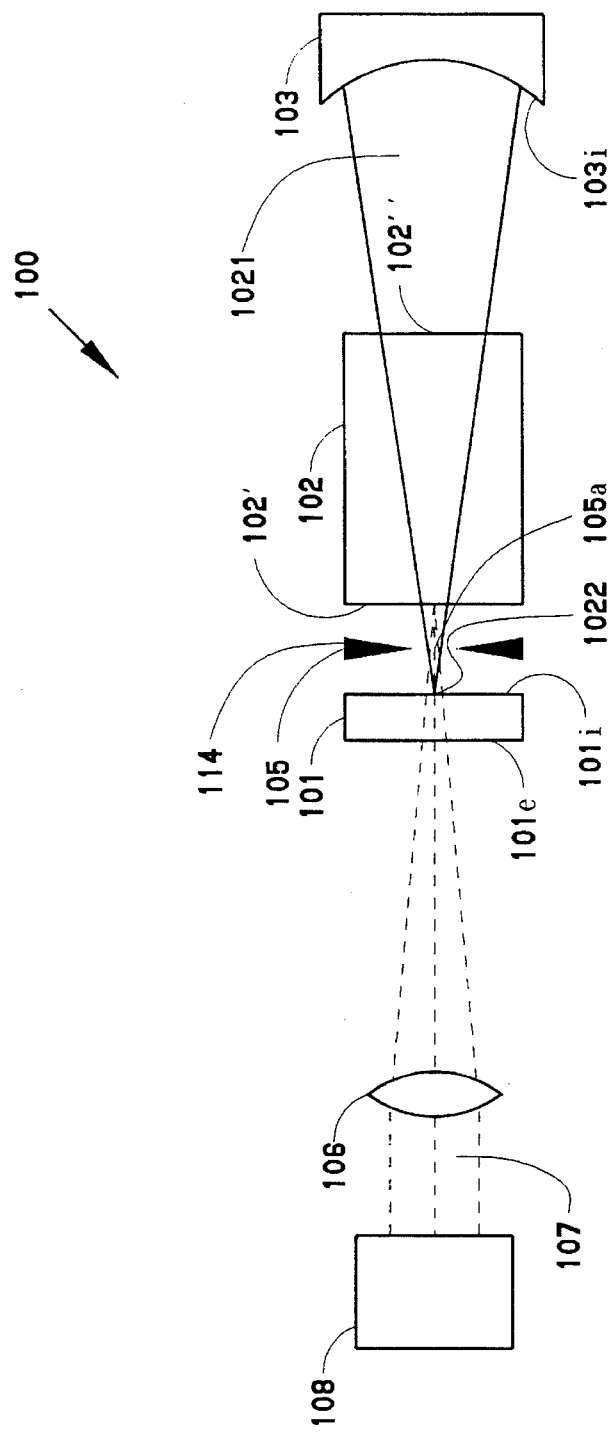
FIG. 10 illustrates a third embodiment of this inventive concept.

A fourth embodiment of this inventive concept is illustrated in FIG. 10. This embodiment incorporates many of the teachings of this inventive concept as described above. Laser resonator cavity 100 is established with HR flat mirror 101 coated on interior face 101$i$ to be HR at an exemplary 1.06 µm and simultaneously AR at 808.5 nm. External face 101$e$ of mirror 101 is coated to be AR at 808.5 nm. Laser gain element 102, which is an exemplary cylindrical laser rod of 1.1% doped Nd:YAG has faces 102' and 102" coated AR at 1.06 µm. Output mirror 103 is coated on interior face 103$i$ to be partially reflective at 1.06 µm. Mirror 101, output mirror 103, and laser gain element 102 are disposed in laser resonator cavity 100 to produce a nearly hemispherical laser resonator mode 1021 having a mode waist 1022 at interior face 101$i$ of mirror 101. Variable speed moving aperture apparatus 105 is located at approximately 1 mm distance from interior face 101$i$ of mirror 101, and the spacing between variable speed moving aperture apparatus 105 and interior face 102' of laser gain element 102 should be minimized as well. Focusing lens 106 is disposed to focus collimated pump light 107, emitted by laser diode 108, at or near face 102' of laser gain element 102.

Figure 11:
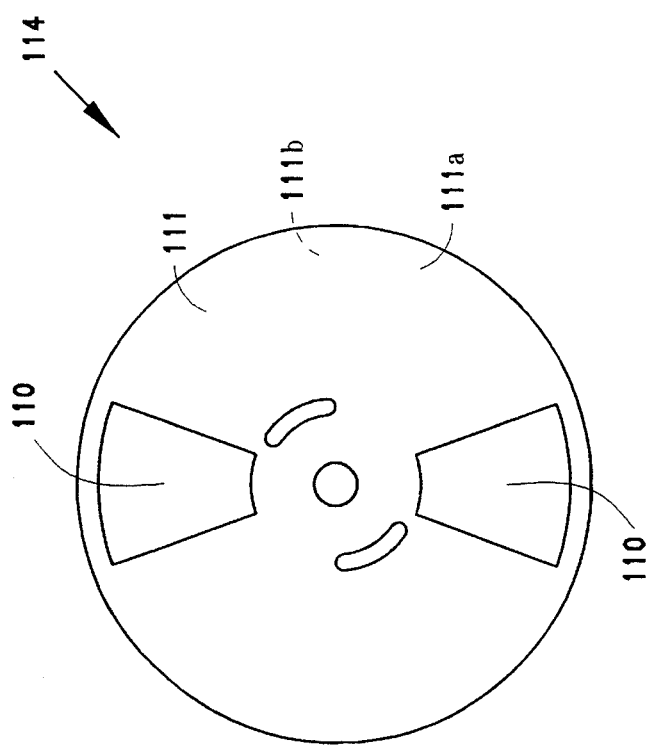
FIG. 11 illustrates a clear, coated aperture blade.

FIG. 11 depicts an aperture blade 114 that is part of the variable speed moving aperture apparatus 105 of FIG. 10. Aperture blade 114 has two open apertures labeled 110, and aperture blade substrate 111 is clear plexiglass or any other suitable transparent material that can withstand rotation at approximately 6,000 RPM. Blade substrate 111 is transmissive for light at the pump wavelength, which in this exemplary case is 808.5 nm. Both sides of substrate 111, labeled 111$a$ and 111$b$, are coated to be highly transmissive at 808.5 nm and highly absorbing at 1.06 µm (the laser emission wavelength) in this exemplary case. The thickness of aperture blade 114, which is the separation between faces 111$a$ and 111$b$, should be relatively small, on the order of 1 mm or less. Substrate material 111 should be mechanically rigid and should be of a material that can be precision machined to the tolerances that were discussed in describing aperture blade 11 of FIG. 1A. For other wavelength ranges, other coatings and other substrates may be more suitable. In general, the coating must be transparent at the wavelength of the pump beam and opaque at the wavelength of the laser resonator mode.

Referring back to FIG. 10, the laser resonator mode diameter can be 10 µm at location 105$a$ where variable speed moving aperture apparatus 105 is inserted. For the exemplary 98 mm diameter aperture blade, the time required to traverse the entire beam diameter would be only 320 ns. As discussed previously, the Q-switch opening time is only a fraction of the time required for the aperture to traverse the entire beam diameter. When an exemplary 0.86 R reflective mirror and an absorbed pump power of 822 mW were used, the pulse build-up time was measured to be 1.9 µs. Since in this case the pulse build-up time is significantly longer than the Q-switch opening time, highly efficient operation can occur and pulse widths on the order of 10 ns or shorter will be obtained. The absorbed pump power of 822 mW is the optimum pump power under these conditions. Laser diode 108 in FIG. 10 can produced either a pulsed or a CW pump beam 107.

Figure 12:
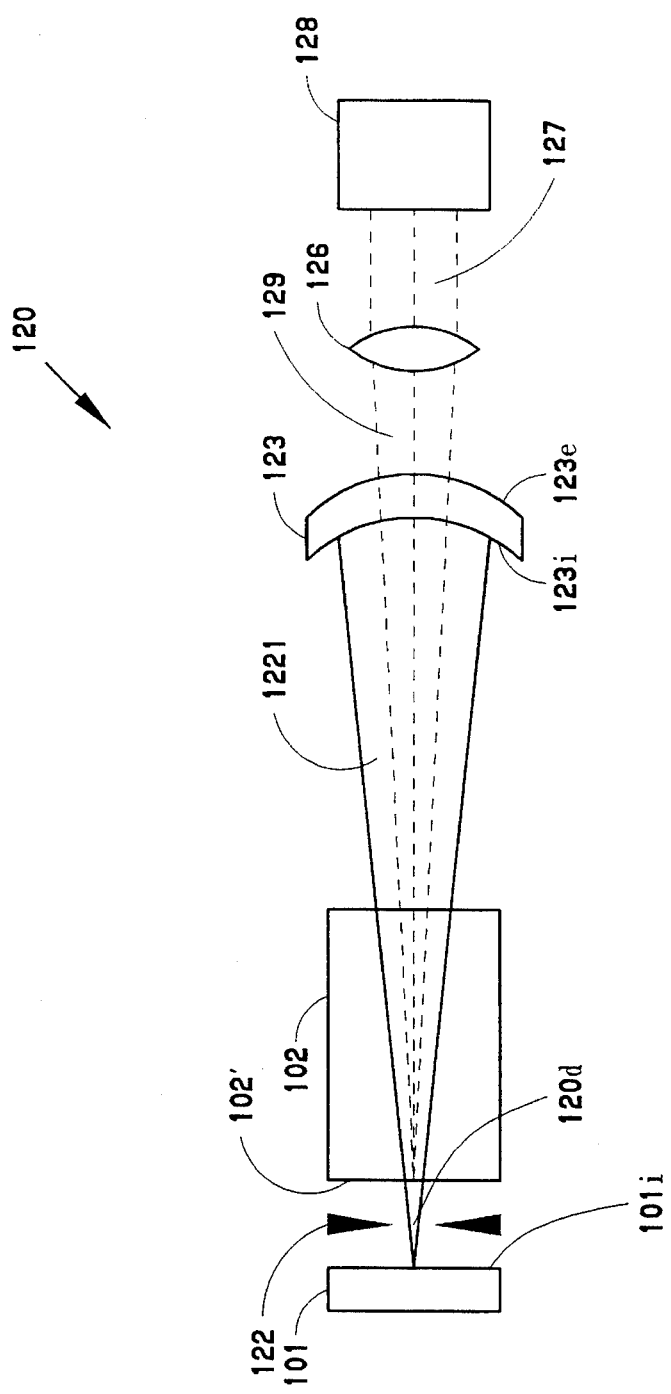
FIG. 12 illustrates a fourth embodiment of this inventive concept.

A fifth embodiment of this inventive concept is illustrated in FIG. 12. Laser resonator cavity 120 is established with output mirror 123, laser gain element 102, HR flat mirror 101, and variable speed moving aperture apparatus 125. Output mirror 123 is a meniscus mirror where the radii of curvature of interior face 123$i$ and exterior face 123$e$ are identical. Output mirror 123, laser gain element 102, and highly reflective flat mirror 101 are aligned and disposed to produce a nearly hemispherical laser resonator mode 1221 and a consequently small mode diameter 120$d$ at the location where variable speed moving aperture apparatus 125 is placed. This location is approximately 1 mm from interior face 101$i$ of HR flat mirror 101.

Laser diode 128 emits a collimated pump beam 127 which may be a pulsed pump beam or a CW pump beam. Focusing lens 126 is disposed to focus collimated pump beam 127 produced by laser diode 128 at or near face 102' of laser gain element 102. The importance of a meniscus substrate for output mirror 123 is that focused pump beam 129 is not distorted as it passes through output mirror 123. External face 123$e$ of output mirror 123 is coated to be AR at the wavelength contained in the pump beam, while internal face 123$i$ of output mirror 123 is coated to be partially reflective at the wavelength of the laser resonator mode and highly transmissive at the wavelength contained in focused pump beam 129.

The advantage of the embodiment shown in FIG. 12 relative to that shown in FIG. 10 is that a standard metallic aperture blade can be used in variable speed moving aperture apparatus 125, as the pump beam does not pass through the aperture blade prior to exciting laser gain element 102. A disadvantage of the embodiment shown in FIG. 12 relative to that shown in FIG. 10 is that the pump waist at or near face 102' will in general be larger than that shown in the arrangement in FIG. 10, as the focal length of focusing lens 126 will be longer than that of focusing lens 106.

For the embodiment shown in FIG. 12, the mode diameter is determined by the configuration of the optical elements in laser resonator cavity 120. The laser resonator mode diameter is on the order of 10 μm at position 120*d* where variable speed moving aperture apparatus 125 is located. The Q-switch opening time will be only a small fraction of the 320 ns required for the aperture edge to traverse the laser resonator mode diameter in this exemplary case. Based on the data illustrated in FIG. 7, the Q-switch opening time will be approximately 100 ns, which is well below the pulse build-up time of approximately 2 μs.

A laser in accordance with this inventive concept has a wide range of applications including various medical, sensing, pollution monitoring, laser ranging, surveillance and communications. It also has applications for aircraft wind speed and wind shear measurement, industrial drilling and other industrial uses.

It should therefore be readily understood that many modifications and variations of the present invention are possible within the purview of the claimed invention. It is therefore to be understood that within the scope of the appended claims, the invention may be practiced otherwise that is specifically described.

I claim:

1. A laser for providing Q-switched emission comprising:

a laser resonator having a laser resonator cavity, said laser resonator including a highly reflective end element, a laser gain element, and an output coupler reflective element arranged to produce a nearly hemispherical laser resonator mode of energy having a laser resonator mode waist;

a laser diode producing optical emission for optically exciting said laser gain element to emit laser emission, said optical emission being focused to produce a pump mode waist that occupies a common region with said laser resonator mode waist; and an aperture apparatus having an aperture blade disposed in said laser resonator cavity near said laser resonator mode waist for interrupting laser resonator oscillation, said aperture blade having a transmissive portion and a portion opaque for said laser emission and being positioned for producing Q-switched emission.

2. The laser of claim 1 in which said pump mode waist is substantially mode-matched to said laser resonator mode waist.

3. The laser of claim 1 in which said optical emission end pumps said laser gain element.

4. The laser of claim 1 in which said aperture apparatus produces single shot Q-switched emission.

5. The laser of claim 1 in which said aperture apparatus produces repetitive Q-switched emission.

6. The laser of claim 1 in which said laser diode produces a continuous optical emission.

7. The laser of claim 1 in which said laser diode produces a pulsed optical emission at a repetition frequency between 20 Hz and 5,000 Hz.

8. The laser of claim 1 in which said laser diode produces a pulsed optical emission that has a pulse duration of less than twice the fluorescence lifetime of dopant ions in said laser gain element, and said pulsed optical emission terminates at approximately the time of the emission of a Q-switched pulse by said laser.

9. The laser of claim 1 in which said laser gain element comprises a Nd:YAG laser gain element.

10. The laser of claim 1 in which said laser gain element contains a doping concentration of approximately 1.1% $Nd^{3+}$ ions.

11. The laser of claim 1 in which said laser gain element contains $Cr^{3+}$ ions.

12. The laser of claim 1 in which said laser diode comprises at least one AlGaAs laser diode.

13. The laser of claim 1 in which said laser diode comprises at least one AlGaInP laser diode.

14. The laser of claim 1 in which said aperture apparatus comprises:

a variable speed motor having a rotation rate between 0 Hz and approximately 100 Hz, and a first aperture blade connected to said variable speed motor having at least one aperture.

15. The laser of claim 14 further including:

a second aperture blade connected to said variable speed motor for producing a variable aperture width when either aperture blade is rotated with respect to the other.

16. The aperture apparatus of claim 15 in which each of said first and said second aperture blades contain a plurality of apertures.

17. The aperture apparatus of claim 14 in which said first aperture blade and said second aperture blade are flat.

18. The aperture blade of claim 1 in which said transmissive portion transmits said optical emission and said laser emission, and said opaque portion transmits said optical emission and absorbs said laser emission.

19. A method for Q-switching a laser comprising the steps of:

providing a laser resonator including an output coupler reflective element, a highly reflective end element, and a laser gain element, disposed to produce a laser resonator mode of energy having a laser resonator mode waist;

pumping said laser gain element with optical emission from a laser diode focused to a pump mode waist that occupies a common region with said laser resonator mode waist to produce laser emission from said laser gain element; and placing an aperture apparatus having an aperture blade near said laser resonator mode waist, said aperture blade being positioned to interrupt laser resonator oscillation for producing Q-switched emission.

20. The method of claim 19 in which said step of providing comprises the step of producing a nearly hemispherical laser resonator mode of energy having said laser resonator mode waist.

21. The method of claim 19 in which said step of pumping comprises the step of end pumping said laser gain element.

22. The method of claim 19 in which said step of pumping comprises the step of substantially mode matching said pump mode waist to said laser resonator mode waist.

23. The method of claim 19 in which said step of placing comprises the step of producing single shot Q-switched emission.

24. The method of claim 19 in which said step of placing comprises the step of producing repetitive Q-switched emission.

25. A method according to claim 19 further comprising the step of:

optimizing the power of said optical emission to produce an optimum pump power determined by the factors of laser resonator gain and loss, and output mirror reflectivity.

26. A method according to claim 19 further comprising the steps of:

providing a plurality of apertures in said aperture blade to assure a predetermined Q-switching repetition rate; and rotating said aperture blade at a rate to assure that the Q-switch opening time is less than the pulse build-up time of the Q-switched pulse.

27. A method according to claim 19 further comprising the step of:

adjusting parameters of said laser to assure that the Q-switch opening time is less than the pulse build-up time of the Q-switched pulse.

28. The method of claim 19 in which said step of pumping comprises the step of generating a CW optical emission.

29. The method of claim 19 in which said step of pumping comprises the step of providing a pulsed optical emission having a pulse duration less than twice the fluorescence lifetime of dopant ions in said laser gain element, said pulsed optical emission terminating when a Q-switched pulse is emitted.

30. A laser for providing Q-switched emission comprising:

a laser resonator having a laser resonator cavity including a laser gain element producing a laser resonator mode of energy having a laser resonator mode waist;

a source of light exciting said laser gain element in an end pumping mode to emit laser emission, said light being focused to produce a pump mode waist that occupies a common region with said laser resonator mode waist; and an aperture apparatus having an aperture blade disposed in said laser resonator cavity for interrupting laser resonator oscillation, said aperture blade having a portion transmissive and a portion opaque for said laser emission.

31. A laser for providing Q-switched emission comprising:

a laser resonator having a laser resonator cavity including a laser gain element, said laser resonator producing a laser resonator mode of energy having a laser resonator mode waist;

a source of light exciting said laser gain element to emit laser emission; and an aperture apparatus having an aperture blade disposed in said laser resonator cavity near said laser resonator mode waist for interrupting laser resonator oscillation, said aperture blade having a portion transmissive and a portion opaque for said laser emission.

32. The laser of claim 31 in which said optical emission end pumps said laser gain element.

* * * * *

UNITED STATES PATENT AND TRADEMARK OFFICE
CERTIFICATE OF CORRECTION

PATENT NO. : 5,528,611
DATED : June 18, 1996
INVENTOR(S) : Richard Scheps

It is certified that error appears in the above-indentified patent and that said Letters Patent is hereby corrected as shown below:

On the title page: Item [54], Column 1, line 2, "LAER" should read -- Laser --.

Signed and Sealed this

Fifteenth Day of October, 1996

Attest:

BRUCE LEHMAN

Attesting Officer  Commissioner of Patents and Trademarks